US006820858B2

(12) United States Patent
Haeberer et al.

(10) Patent No.: US 6,820,858 B2
(45) Date of Patent: Nov. 23, 2004

(54) ELECTROMAGNETIC VALVE FOR CONTROLLING AN INJECTION VALVE OF AN INTERNAL COMBUSTION ENGINE

(75) Inventors: Rainer Haeberer, Bretten (DE); Matthias Horn, Freiberg (DE); Andreas Rettich, Herrenberg (DE); Robert Hajnovic, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 10/168,671

(22) PCT Filed: Sep. 5, 2001

(86) PCT No.: PCT/DE01/03396

§ 371 (c)(1), (2), (4) Date: Oct. 24, 2002

(87) PCT Pub. No.: WO02/35080

PCT Pub. Date: May 2, 2002

(65) Prior Publication Data

US 2003/0127614 A1 Jul. 10, 2003

(30) Foreign Application Priority Data

Oct. 24, 2000 (DE) ........................................ 100 52 604

(51) Int. Cl.[7] ................................................ F16K 31/02
(52) U.S. Cl. .............................. 251/129.16; 251/129.21
(58) Field of Search ....................... 251/129.15, 129.16, 251/129.12, 50, 52, 117; 137/601.18

(56) References Cited

U.S. PATENT DOCUMENTS 5,560,549 A * 10/1996 Ricco et al. ........... 239/533.08
5,901,941 A * 5/1999 Ricco .................... 251/129.16

FOREIGN PATENT DOCUMENTS

| | | |
|---|---|---|
| DE | 196 50 865 | 6/1998 |
| DE | 197 08 104 | 9/1998 |
| EP | 0 321 135 | 6/1989 |
| EP | 0 604 914 | 7/1994 |

* cited by examiner

*Primary Examiner*—Edward K. Look
*Assistant Examiner*—John K. Fristoe, Jr.
(74) *Attorney, Agent, or Firm*—Kenyon & Kenyon

(57) ABSTRACT

A solenoid valve for controlling an injection valve of an internal combustion engine is provided, including an electromagnet, a movable armature, a control valve member moved with the armature and cooperating with a valve seat for opening and closing a fuel discharge channel of a control pressure chamber of the injection valve, and a sliding piece guiding the armature, which is positioned together with the armature and the control valve member in an armature chamber. For reducing the bounce of the armature, the sliding piece subdivides the armature chamber into a pressure relief chamber connected to a fuel low-pressure connection and an hydraulic damping chamber, into which a fuel discharge channel opens. The damping chamber may be pressure-relieved to a pressure relief chamber via at least one connecting channel provided with a throttle, the speed of the control valve member being lowered during the closing of solenoid valve, before impact on valve seat, by a fuel pressure cushion acting upon the control valve member in the damping chamber.

9 Claims, 4 Drawing Sheets

ELECTROMAGNETIC VALVE FOR CONTROLLING AN INJECTION VALVE OF AN INTERNAL COMBUSTION ENGINE

FIELD OF THE INVENTION

The present invention relates to a solenoid valve for controlling a fuel injector of an internal combustion engine.

BACKGROUND INFORMATION

Such a solenoid valve, as referred to in German Published Patent Application No. 196 50 865, may be used for the control of the fuel pressure in the control pressure chamber of a fuel injector, such as an injector of a common-rail fuel injection system. The fuel pressure in the control pressure chamber controls the movement of a valve plunger, by which an injection opening of the fuel injector may be opened or closed. The solenoid valve has an electromagnet positioned in a portion of the housing, a movable armature, and a control valve member, which is movable with the armature and acted upon by a closing spring in the closing direction. The closing spring cooperates with a valve seat of the solenoid valve and thereby controls the fuel outflow from the control pressure chamber. In the solenoid valve referred to in German Published Patent Application No. 196 50 865, the armature includes two parts, namely, an armature bolt and an armature plate slidingly supported on the armature bolt. Solenoid valves may also include single-part armatures for controlling fuel injectors, in which the armature bolt is firmly connected to the armature plate.

It is believed that these solenoid valves have disadvantageous armature bounce. When the magnet is switched off, the armature and the control valve member are accelerated toward the valve seat by the closing spring of the solenoid valve, to close a fuel outflow channel from the control pressure chamber. The bounce of the control valve member onto the valve seat may result in a disadvantageous vibration and/or bounce of the control valve member onto the valve seat. This may impair the control of the fuel injection process. In the solenoid valve referred to in German Published Patent Application No. 196 50 865, therefore, the armature plate is positioned movably on the armature bolt so that, upon the bouncing of the control valve member onto the valve seat, the armature plate moves counter to the tension force of a return spring. As a result, the effectively braked mass and thus the kinetic energy causing the bounce of the armature hitting the valve seat may be diminished. However, the armature plate may post-oscillate on the armature bolt after the closing of the solenoid valve, so that additional measures may be required for damping the undesired post-oscillation of the armature plate.

SUMMARY OF THE INVENTION

In an exemplary solenoid valve according to the present invention, a sliding element, which guides the armature, is positioned in the armature space of the solenoid valve, so that the armature space is subdivided into a pressure relief chamber connected to a fuel low-pressure connection and a hydraulic damping chamber, into which the fuel outflow channel opens from the control pressure chamber. The damping chamber is connected to the pressure relief chamber via at least one connecting channel equipped with a throttle.

When the solenoid valve is closed, the control valve member, in the damping chamber, moves toward the valve seat. This causes a rapid displacement of the fuel in the damping chamber, which may not immediately escape into the relief chamber through the throttle-equipped connecting channel. Thus, a fuel pressure cushion is formed, which opposes the motion of and brakes the control valve member together with the armature, so that the impulse transmitted onto the valve seat by the striking of the valve seat by the control valve member is reduced. This permits reduction of the armature bounce (or the bouncing movement of the control valve member on the valve seat). Therefore, by the use of an exemplary solenoid valve according to the present invention, shorter intervals may be set between pre-injection, main injection and post-injection, since the armature requires less time for achieving a defined neutral position. This also applies for solenoid valves, in which the armature plate is formed as one piece with the armature bolt. One-piece armatures may be manufactured with less effort and may reduce costs.

When the solenoid valve is open, the fuel flowing out of the fuel outflow channel of the control pressure chamber first flows into the damping chamber. Due to the throttling of the fuel flow from the damping chamber into the pressure relief chamber, a defined pressure pattern in the pressure relief chamber is ensured, or at least made more probable. This may positively effect the motion of the armature in the pressure relief chamber, and thus the course of the injection procedure. A pressure surge, which may form in the control pressure chamber when the fuel discharge channel is opened, does not directly reach the pressure relief chamber, but rather, first reaches the damping chamber. Only after reaching the damping chamber, does the pressure surge reach the pressure relief chamber via the connecting channel equipped with the throttle. Quantitative deviations between individual injection processes may be advantageously decreased by the division of the armature chamber.

Furthermore, the pressure cushion generated in the damping chamber may reduce the seat loading of the valve seat at high closing forces.

It is believed to be advantageous to adjust the volume of the damping chamber and the at least one throttle to one another, so that an approximately constant fuel pressure is established in the damping chamber after a relaxation period, after the opening of the solenoid valve.

The sliding piece includes a sliding sleeve guiding the armature and a flange region, forming a separating wall between the damping chamber and the pressure relief chamber. This stationarily holds the sliding piece in the armature chamber. By this measure, a defined volume of the damping chamber may be simply set.

It is believed to be advantageous to design the at least one connecting channel as a feed-through opening furnished with a throttle in the flange region of the sliding piece, since it may be easy to manufacture the connecting channel in the sliding piece. Since the at least one feed-through opening is positioned inside the projection of the armature plate in the direction of motion of the armature, the fuel flowing from the damping chamber into the pressure relief chamber may flow against the armature plate, which may support the braking procedure of the armature.

Since the sliding sleeve guiding the armature projects away from the flange of the sliding piece toward the valve seat, a sufficiently dimensioned damping chamber may be formed between the sliding sleeve and the housing of the solenoid valve.

In another exemplary embodiment according to the present invention, the throttle section of the at least one connecting channel is formed by a slit in an end face of a valve piece set into the housing of the fuel injector facing the damping chamber and furnished with the valve seat, the slit being covered by a support part partially bordering on the damping chamber.

The support part may be, for instance, a screw member holding the valve piece in the housing.

A section of the connecting channel, which connects the damping chamber to the pressure relief chamber, may be formed by a leakage channel situated inside the housing of the fuel injector.

DETAILED DESCRIPTION

Figure 1:
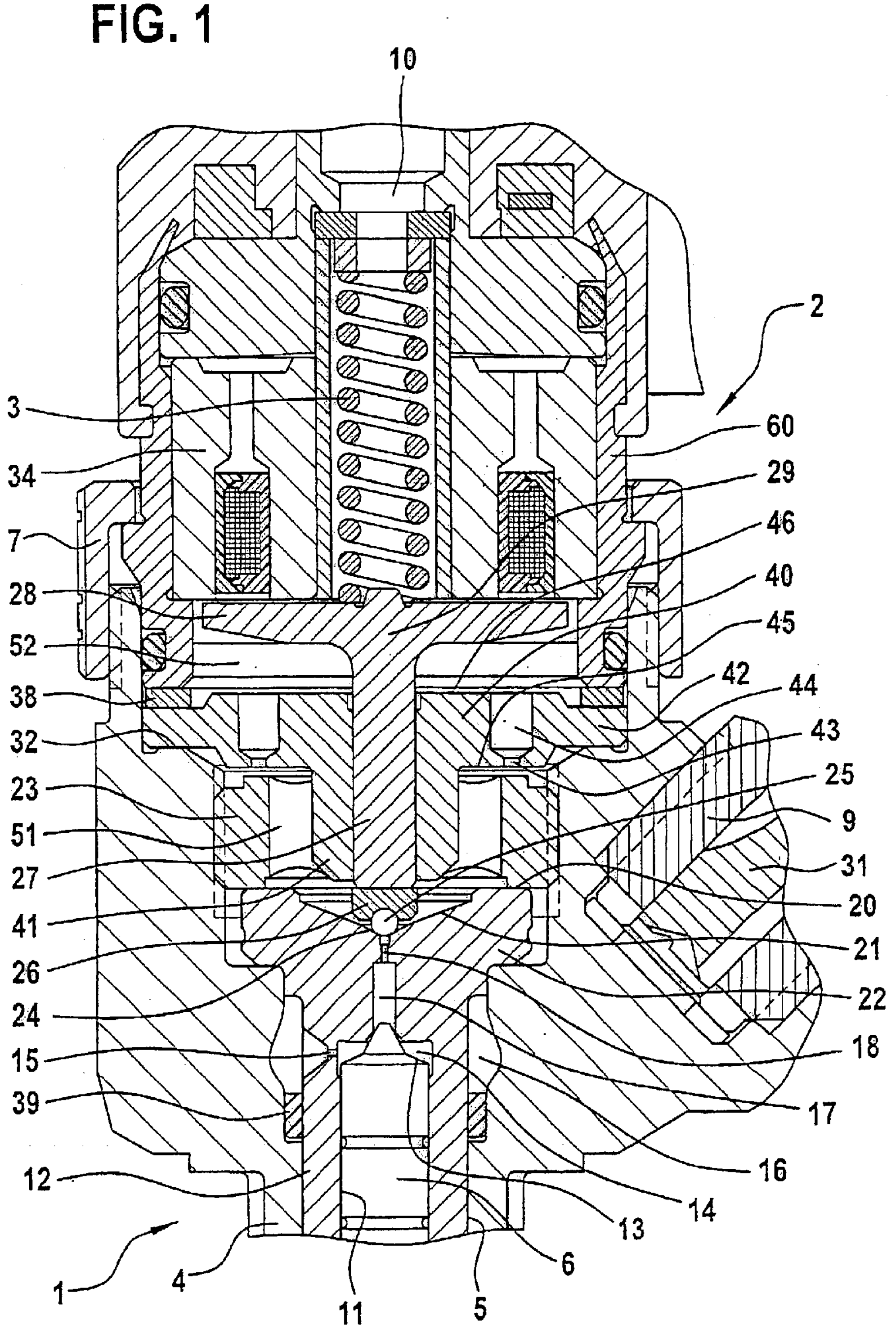
FIG. 1 is a cross sectional view through the upper part of a fuel injector having an exemplary solenoid valve according to the present invention.

FIG. 1 shows the upper part of a fuel injector 1, which may be used, for example, in a fuel injection system equipped with a fuel high-pressure reservoir that is continually supplied with high-pressure fuel by a high-pressure booster pump. Fuel injector 1 has a valve housing 4 including a longitudinal bore 5, in which a valve plunger 6 is positioned. The plunger 6 acts, with its one end, upon a valve needle positioned in a nozzle body (not shown). The valve needle is positioned in a pressure chamber in the lower part (not shown) of fuel injector 1, which is supplied with fuel under high pressure via a pressure bore 8. When valve plunger 6 undergoes an opening lift movement, the valve needle is lifted by the fuel high pressure in the pressure chamber counter to the closing force of a spring (not shown), with the fuel high pressure being steadily applied to a pressure shoulder of the valve needle. The injection of the fuel into the combustion chamber of the internal combustion engine occurs through an injection orifice connected to the pressure chamber. By lowering valve plunger 6, the valve needle is pressed in the closing direction into the valve seat (not shown) of the fuel injector, and the injection process is ended.

As shown in FIG. 1, valve plunger 6 is guided in a cylindrical bore 11 at its end facing away from the valve needle, which has been inserted into valve piece 12 set into valve housing 4. In cylindrical bore 11, end face 13 of valve plunger 6 closes in a control-pressure chamber 14, which is connected to a fuel high-pressure connection via a supply channel.

The supply channel includes three parts. A bore extending radially through the wall of valve piece 12, the inner walls of which form a supply throttle 15 along part of its length, is connected to an annular space 16 surrounding valve piece 12 on its outer circumference, which communicates with the fuel high-pressure connection of a connecting piece 9, which may be screwed into valve housing 4, via a fuel filter 31 inserted into the supply channel. Annular space 16 is sealed against longitudinal bore 5 by a sealing ring 39. Control pressure chamber 14 is subjected, via supply throttle 15, to the high fuel pressure prevailing in the fuel high-pressure reservoir. A bore branches off from control pressure chamber 14 extending in valve piece 12 coaxially with valve plunger 6, forming a fuel discharge channel 17 provided with a discharge throttle 18. The outlet of fuel discharge channel 17 from valve piece 12 is in the region of a cone-shaped countersunk section 21 of outlying end face 20 of valve piece 12. Valve piece 12 may be tightly set into valve housing 4, for example, by using a screw element 23 in a flange region 22.

The opening and closing of the fuel injector is controlled by a solenoid valve, which opens and closes fuel discharge channel 17, thereby controlling the pressure in the control pressure chamber. When fuel discharge channel 17 is closed, control pressure chamber 14 is closed toward the discharge side, so that the high pressure, which is also present in the fuel high-pressure reservoir, rapidly builds via the supply channel. The pressure in control pressure chamber 14 generates a closing force on valve plunger 6 via the surface of end face 13, and thus on the valve needle connected with it. This force may be greater than the forces acting in the opening direction as a result of the high pressure. If control pressure chamber 14 is opened toward the discharge side by opening the solenoid valve, the pressure in the low volume of control pressure chamber 14 rapidly decreases, since it is decoupled from the high-pressure side via supply throttle 15. As a result, the force acting on the valve needle in the opening direction outbalances the high fuel pressure at the valve needle, so that the latter moves upwards, and the at least one injection orifice is opened for injection. However, if solenoid valve 30 closes fuel discharge channel 17, the pressure in control pressure chamber 14 may build again as the result of fuel that may continue to flow via supply channel 15, so that the original closing force is present, and the valve needle of the fuel injector closes.

FIG. 1 shows an exemplary solenoid valve 2 according to the present invention. In countersunk section 21 of valve piece 12, a valve seat 24 is formed, which cooperates with a control valve member 25,26 of a solenoid valve 2 controlling the injection valve. The control valve member of solenoid valve 2 includes a ball 25 and a guide piece 26 accommodating the ball, which is coupled to an armature 29 that cooperates with an electromagnet 34 of the solenoid valve. Solenoid valve 2 also includes a housing part 60, containing electromagnet 34, which is firmly connected to valve housing 4 via connecting arrangement 7, which may, for example, be screwed together. Armature 29 is formed in one piece, with armature plate 28 and an armature bolt 27, and positioned in an armature chamber 51,52 of solenoid valve 2. Armature 29 and control valve member 25,26, coupled to armature bolt 27, are acted upon by a housing-mounted supported closing spring 3 in the closing direction of the solenoid valve, so that control valve member 25,26 normally lies adjacent to valve seat 24 in the closing position, and closes fuel discharge channel 17. A sliding piece 40 is positioned in the armature chamber. The sliding piece 40 guides movable armature 29 and includes a flange region 42 and a sleeve 41, in which armature bolt 27 of armature 29 is slidably supported. Flange region 42 of sliding piece 40 is firmly held, together with a spacer ring 38, between housing part 60 and a shoulder 32 of housing part 4 of the injection valve. Sliding piece 40 subdivides the armature chamber into a pressure relief chamber 52, which is connected to a fuel low-pressure connection 10 of the injection valve, and an hydraulic damping chamber 51, into which fuel discharge channel 17 opens. In this regard, flange region 42 forms a barrier between damping chamber 51 and pressure relief chamber 52, a first side 45 of flange region 42 facing damping chamber 51, and a second side 46 facing pressure relief chamber 52. Sliding sleeve 41 projects away from first side 45 of flange region 42 as it extends closer to valve seat 24, so that an annular space formed between sliding sleeve 41 and screw member 23 is connected to cone-shaped, countersunk section 21 of valve piece 12. The volume of the annular space may be, for example, more than twice the inner volume of cone-shaped, countersunk section 21, and the annular space may include the major portion of damping chamber 51. Flange region 41 further includes two feed-through openings 44, each of which has a throttle 43 and forms a connecting channel between damping chamber 51 and pressure relief chamber 52. Feed-through openings 44 are diametrically opposite one another with respect to armature bolt 27, and may be formed as bore holes. The diameter of the two throttle locations 43 may be, for example, 0.6 mm.

When the solenoid valve is opened, armature plate 28 is attracted by electromagnet 34, thereby opening fuel discharge channel 17 leading to armature chambers 51,51. The fuel flowing from fuel discharge channel 17, provided with throttle 18, first reaches damping chamber 51. From there, the fuel flows to pressure relief chamber 52, via feed-through openings 44 provided with throttles 43, which is connected to fuel low-pressure connection 10 which, in turn, is connected to a fuel return flow of injection valve 1 (not shown). The volume of damping chamber 51 and throttles 43 are adjusted to one another, so that an approximately constant fuel pressure prevails in damping chamber 51 when the solenoid valve is open.

During closing of the solenoid valve, closing spring 3 moves armature bolt 27 with control valve member 25,26 to valve seat 24. Since the control valve member penetrates into the damping chamber, fuel, which may not immediately escape completely into pressure relief chamber 52 because of, for example, connecting channel 44 being provided with the throttle, is displaced from the damping chamber, so that the pressure rises in the damping chamber, and the movement of the control valve member is braked by a fuel pressure cushion, which engages with control valve member 25,26 and with the lower part of armature bolt 27 counter to the closing direction of the armature bolt. As a result, the armature is braked, so that the impulse transmitted from control valve member 25,26 hitting valve seat 24 is diminished. Simultaneously, the fuel flowing through feed-through openings 44 from damping chamber 51 into pressure relief chamber 52 brakes armature plate 28, which is above the feed-through openings 44, so that armature 29 is braked during the closing motion. The bounce of armature 29 and of control valve member 25,26 at valve seat 24 may be reduced by the exemplary solenoid valve 2 according to the present invention.

Figure 2:
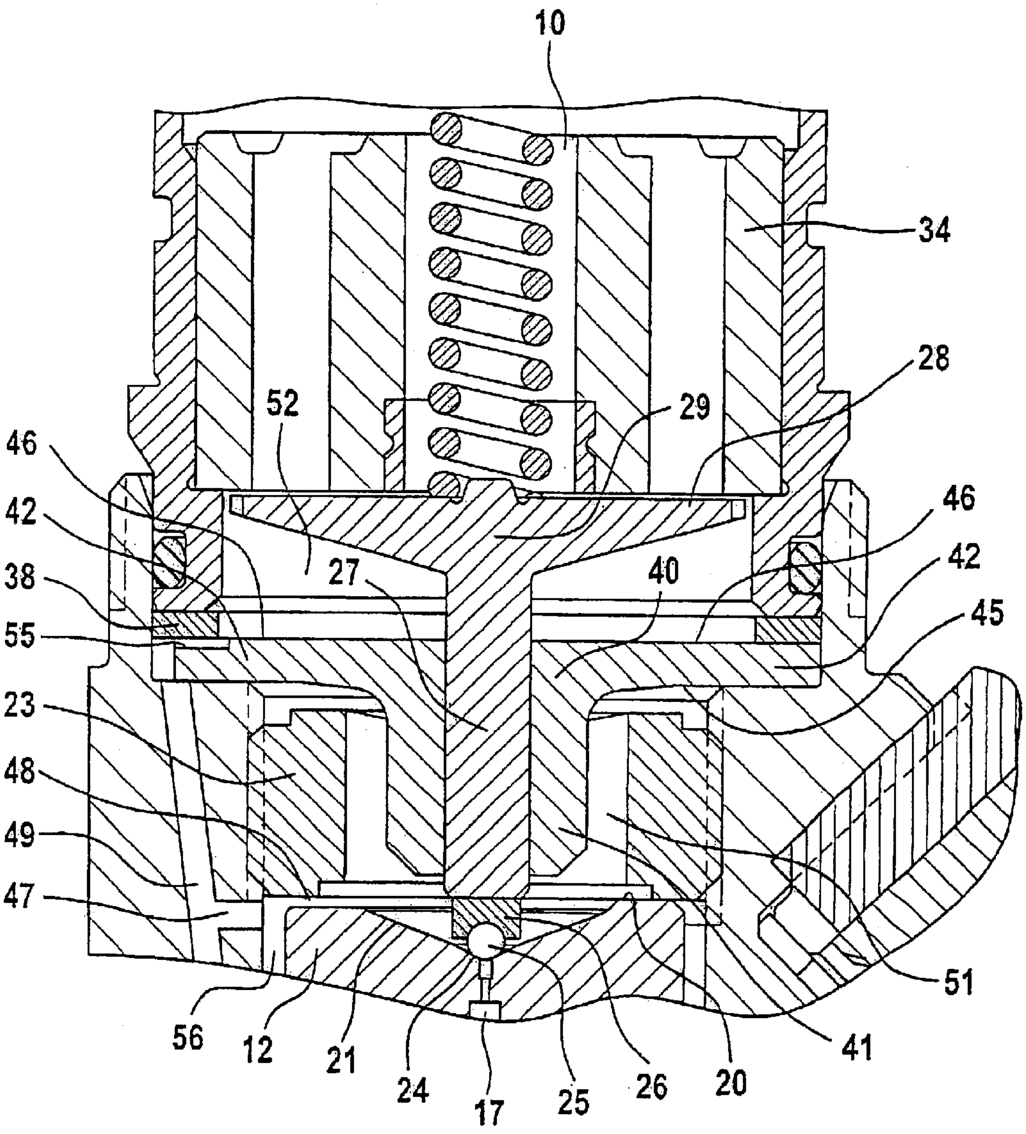
FIG. 2 is a cross sectional view through a second exemplary solenoid valve according to the present invention.

FIG. 2 shows another exemplary solenoid 2 according to the present invention, in which the same parts are provided with the same reference numerals. This embodiment differs from the exemplary embodiment described above with reference to FIG. 1 in that flange region 42 has no feed-through openings. The connecting channel between damping chamber 51 and pressure relief chamber 52 is formed by slit 48 in end face 20, including valve seat 24, of valve piece 12, an annular space 56 surrounding the valve piece, a transverse bore hole 47 in housing part 4 of the injection valve, a leakage channel 49 and a notch 55 on the second side 46 of flange region 42 of sliding piece 40. Slit 48 is covered by a support part 23, which partially borders damping chamber 51. In the exemplary embodiment described with reference to FIG. 2, the support part is a screw member firmly holding valve piece 12 in housing part 4. Slit 48, covered by screw member 23, which connects countersunk sections 21 at end face 20 of valve piece 12 to annular chamber 56, is a throttle channel. When the solenoid valve is closed, fuel flows through throttle channel 48, annular chamber 56 and transverse bore 47 into leakage channel 49. From there, the fuel flows into pressure relief chamber 52. In the exemplary embodiment described with reference to FIG. 2, the throttle channel, formed by slit 48 and screw member 23, has the same function as throttles 43 of the first exemplary embodiment according to the present invention described above with reference to FIG. 1. Leakage channel 49 is used for flow return of leakage fuel from longitudinal bore hole 5 into the fuel return flow of the injection valve, which may be provided with injection valves. As shown in FIG. 2, leakage channel 49 forms a section of the connecting channel between damping chamber 51 and pressure relief chamber 52.

Figure 3:
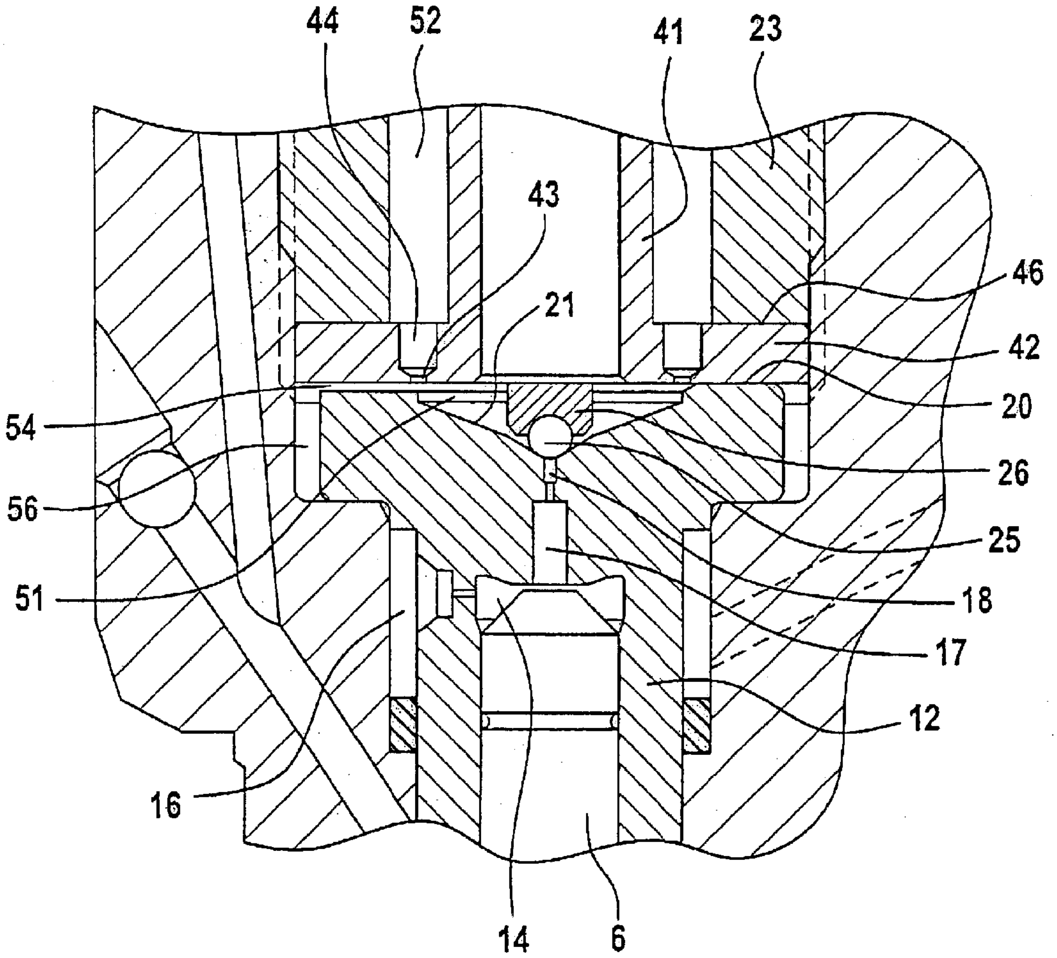
FIG. 3 is a cross sectional view through a third exemplary solenoid valve according to the present invention.

FIG. 3 shows a third exemplary embodiment according to the present invention. FIG. 3 does not show armature 29, which is guided by sliding sleeve 41. As opposed to the exemplary embodiment described above with reference to FIG. 1, sliding piece 40 lies with flange region 42 directly on end face 20 of valve piece 12. In this exemplary embodiment according to the present invention, sliding sleeve 41, for guiding the armature, projects away from the flange region on its second side 46 of the flange region facing away from the valve piece. Screw member 23 holds gliding piece 40 together with valve piece 12 in housing part 4. Furthermore, at least one recess 54 is provided at end face 20 of the valve piece, which connects cone-shaped, countersunk section 21 at the end face 20 of valve piece 12 to annular chamber 56. The at least one recess 54 is formed large so that, in contrast to the exemplary embodiment described above with reference to FIG. 2, the at least one recess 54 does not function as a throttle. Therefore, in the exemplary embodiment according to the present invention described with reference to FIG. 3, the damping chamber is formed by annular chamber 56, and the cone-shaped volume is formed above countersunk section 21. As shown in FIG. 3, the volume of annular chamber 56 is twice as large as the volume above countersunk section 21. As with the exemplary embodiment according to the present invention described above with reference to FIG. 1, damping chamber 51 is connected to pressure relief chamber 52 via two feedthrough openings 44, each of which includes one throttle 43.

Figure 4:
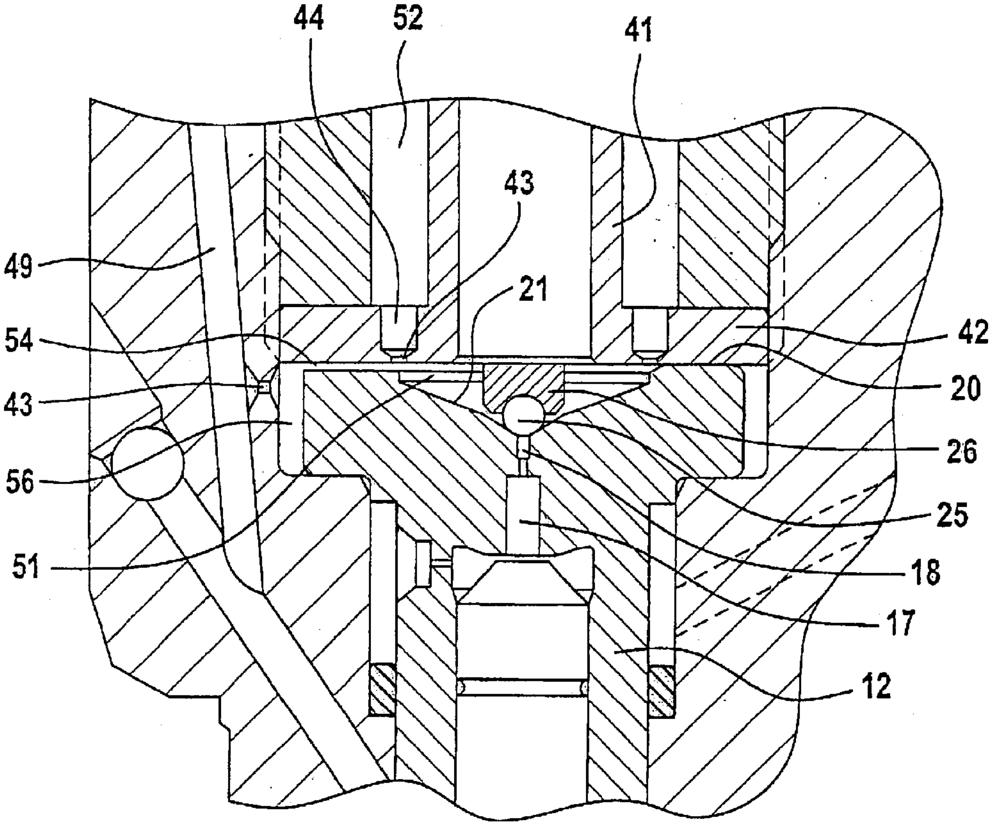
FIG. 4 is a cross sectional view through a fourth exemplary solenoid valve according to the present invention.

FIG. 4 shows a fourth exemplary solenoid valve according to the present invention. Flange region 42 of sliding piece 40 has no feed-through openings. Damping chamber 51 is formed by the cone-shaped volume above countersunk section 21 and annular chamber 56, which are connected to one another by at least one recess 54 leading into the end face of valve piece 12. The at least one recess 54 is sufficiently large so as not to function as a throttle. A throttle 43 provided in the side wall of housing part 4 connects annular chamber 56 to a leakage channel 49, which is connected to pressure relief chamber 52.

What is claimed is:

1. A solenoid valve for controlling an injection valve of an internal combustion engine, comprising:

an electromagnet;

a movable armature;

a control valve member operable to be moved by the movable armature, the control valve member cooperating with a valve seat for opening and closing a fuel discharge channel of a control pressure chamber of the injection valve; and a sliding piece guiding the moveable armature;

wherein the sliding piece, the moveable armature and the control valve member are positioned in an armature chamber;

wherein the sliding piece subdivides the armature chamber into a pressure relief chamber and a hydraulic damping chamber;

wherein the pressure relief chamber is connected to a fuel low-pressure connection;

wherein the fuel discharge channel opens into the hydraulic damping chamber;

wherein the hydraulic damping chamber is operable to be pressure-relieved toward the pressure relief chamber via at least one connecting channel provided with at least one throttle;

wherein a speed of the control valve member is reduced upon a closing of the solenoid valve by a fuel pressure cushion acting upon the control valve member in the hydraulic damping chamber before an impact on the valve seat;

wherein the sliding piece includes a sliding sleeve guiding the moveable armature and a flange region forming a partition between the hydraulic damping chamber and the pressure relief chamber, and the flange region stationarily holds the sliding piece in the armature chamber; and wherein the sliding sleeve is positioned away from the flange region in a direction of the valve seat.

2. The solenoid valve of claim 1, wherein a volume of the hydraulic damping chamber and the at least one throttle are adjusted to one another so that an approximately constant fuel pressure prevails in the hydraulic damping chamber when the solenoid valve is open.

3. A solenoid valve for controlling an injection valve of an internal combustion engine, comprising:

an electromagnet;

a movable armature;

a control valve member operable to be moved by the movable armature, the control valve member cooperating with a valve seat for opening and closing a fuel discharge channel of a control pressure chamber of the injection valve; and a sliding piece guiding the moveable armature;

wherein the sliding piece, the moveable armature and the control valve member are positioned in an armature chamber;

wherein the sliding piece subdivides the armature chamber into a pressure relief chamber and a hydraulic damping chamber;

wherein the pressure relief chamber is connected to a fuel low-pressure connection;

wherein the fuel discharge channel opens into the hydraulic damping chamber;

wherein the hydraulic damping chamber is operable to be pressure-relieved toward the pressure relief chamber via at least one connecting channel provided with at least one throttle;

wherein a speed of the control valve member is reduced upon a closing of the solenoid valve by a fuel pressure cushion acting upon the control valve member in the hydraulic damping chamber before an impact on the valve seat; and wherein a section of the connecting channel provided with the at least one throttle includes a slit in an end face of a valve piece set into a housing of the injection valve facing the hydraulic damping chamber and provided with the valve seat, and the slit is covered by a support part partially bordering on the hydraulic damping chamber.

4. The solenoid valve of claim 3, wherein the sliding piece includes a sliding sleeve guiding the moveable armature and a flange region forming a partition between the hydraulic damping chamber and the pressure relief chamber, and the flange region stationarily holds the sliding piece in the armature chamber.

5. The solenoid valve of claim 4, wherein the at least one connecting channel includes at least one feed-through opening in the flange region of the sliding piece, and the at least one feed-through channel includes the at least one throttle.

6. The solenoid valve of claim 5, wherein the at least one feed-through opening is positioned within a projected extent of an armature plate of the moveable armature in a direction of motion.

7. The solenoid valve of claim 3, wherein the support part includes a screw member holding the valve piece in the housing.

8. The solenoid valve of claim 3, wherein the slit connects a countersunk section of the end face of the valve piece to an annular chamber surrounding the valve piece, the countersink section is provided with the valve seat and the annular chamber is connected to the pressure relief chamber via further sections of the connecting channel.

9. The solenoid valve of claim 8, wherein a section of the connecting channel is formed by a leakage channel in the housing of the injection valve.

* * * * *